(12) United States Patent
Chuang et al.

(10) Patent No.: US 11,527,190 B1
(45) Date of Patent: Dec. 13, 2022

(54) COLOR CALIBRATION USING REFLECTED COLOR CALIBRATION PATTERNS

(71) Applicant: HEWLETT-PACKARD DEVELOPMENT COMPANY, L.P., Spring, TX (US)

(72) Inventors: Chia-Wen Chuang, Taipei (TW); Chia-Hung Chu, Taipei (TW); Chih-Chen Hung, Taipei (TW); Wan-Chieh Lu, Taipei (TW); Hung-Ming Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/710,718

(22) Filed: Mar. 31, 2022

(51) Int. Cl.
*G09G 3/20* (2006.01)
*G06F 3/042* (2006.01)

(52) U.S. Cl.
CPC .......... *G09G 3/2003* (2013.01); *G06F 3/042* (2013.01); *G09G 2320/0666* (2013.01); *G09G 2320/0693* (2013.01); *G09G 2354/00* (2013.01); *G09G 2360/144* (2013.01)

(58) Field of Classification Search
CPC .... G06F 1/1652; G06F 1/1643; G06F 1/1616; G06F 2203/04803; G06F 2203/04102; G06F 3/033; G06F 3/041; G06F 3/042; G09G 3/035; G09G 3/3413; G09G 2320/0285; G09G 2320/0666; G09G 2320/0693; G09G 2320/0626; G09G 2320/0233; G09G 2320/0242; G09G 2360/144; G09G 2360/147; G09G 2380/02
See application file for complete search history.

(56) References Cited

U.S. PATENT DOCUMENTS

| | | | |
|---|---|---|---|
| 2009/0184947 A1* | 7/2009 | Hupman | G09G 5/02 345/207 |
| 2019/0035319 A1* | 1/2019 | Kapinos | G06F 1/1686 |
| 2021/0097955 A1* | 4/2021 | Nicholson | G01J 3/0202 |

* cited by examiner

*Primary Examiner* — Dong Hui Liang
(74) *Attorney, Agent, or Firm* — Perry + Currier Inc

(57) ABSTRACT

An example computing device includes: a display to display a color calibration pattern; a touchpad to receive input for the computing device, the touchpad having a reflective layer to reflect the color calibration pattern; a color sensor to detect the reflected color calibration pattern from the touchpad; a processor interconnected with the color sensor and the display, the processor to calibrate a color output of the display based on the color calibration pattern detected at the color sensor.

15 Claims, 5 Drawing Sheets

COLOR CALIBRATION USING REFLECTED COLOR CALIBRATION PATTERNS

BACKGROUND

Displays for computing devices may periodically be color calibrated to ensure that the color outputs match the intended outputs. Color calibration on mobile devices such as laptop computers may be difficult and use additional sensors to capture the color outputs for calibration.

DETAILED DESCRIPTION

Color calibration of displays may generally be achieved by detecting the actual color output of the display and comparing it to the input to determine differences and calibrate accordingly. The actual color output may of the display may be captured by devices or sensors external to the display, however it may be cumbersome to manage another external device, and the calibration may be inconsistent based on variability in the color capture capability of different external sensors. Accordingly, in some mobile computing devices, such as laptop computers, self-calibration may be achieved, in some examples, by including a sensor in the touchpad or base to place the sensor opposite the display to allow the sensor to capture display outputs. This reduces the inconvenience of managing and connecting separate devices and improves consistency since the parameters and attributes of the sensor are fixed and may be calibrated for. However, such a solution increases costs by adding an additional sensor to the mobile device and increasing manufacturing complexity to implement, for example by precisely cutting the touchpad or the base to accommodate the sensor.

An example computing device includes a display, a touchpad, a color sensor, and a processor to calibrate the display. In particular, the touchpad includes a reflective layer to reflect a color calibration pattern displayed by the display, and the color sensor is to detect the reflected color calibration pattern from the touchpad. Accordingly, the computing device uses the reflection of a displayed color calibration pattern off of the touchpad when the computing device is closed as detected by the color sensor to perform the color calibration. Thus, the example computing device may leverage an existing sensor in the display housing rather than adding a secondary sensor, and reduces manufacturing complexity since the touchpad may be assembled whole, rather than being cut to accommodate the secondary sensor.

The touchpad may therefore include a reflective layer to enhance the reflection of the color calibration for detection by the color sensor. The field of view of the color sensor may be entirely encompassed by the touchpad when the computing device is closed to optimize reflection to the color sensor. Since a reflection of the color calibration pattern is being used for calibration, an adjustment factor may be applied to the detected color calibration pattern to compensate for loss or changes in the detected color due to the reflection. This adjustment factor may be a factory setting which is determined per model of computing device.

Figure 1:
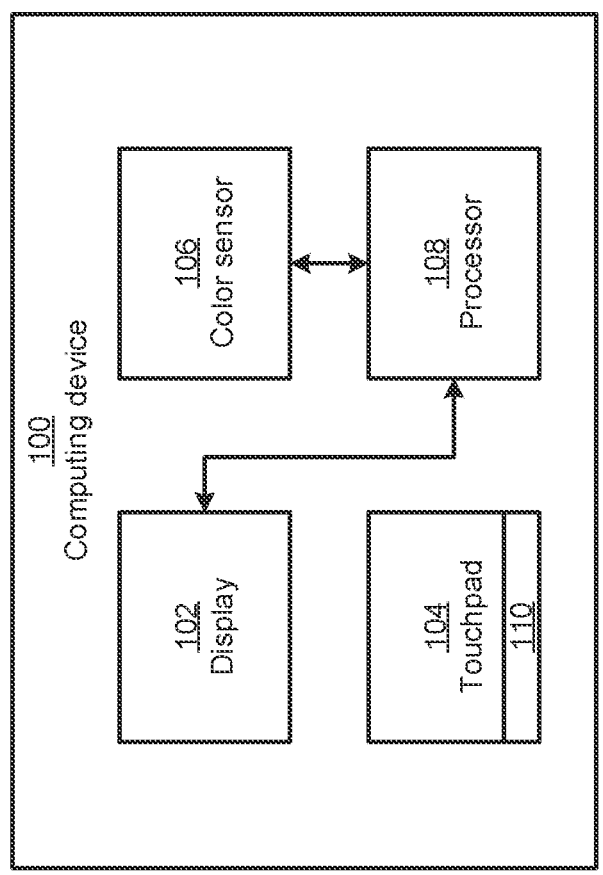
FIG. 1 is a block diagram of an example computing device to color calibrate a display using a reflected color calibration pattern.

FIG. 1 shows a block diagram of an example computing device 100 to color calibrate a display 102 using reflected color calibration patterns. The computing device 100 includes the display 102, a touchpad 104, a color sensor 106 and a processor 108.

The display 102 is generally configured to display data or other outputs from the computing device 100. In particular, the display 102 may be a color display employing LCD (liquid crystal display) technology, LED (light-emitting diode) technology, or other suitable display technology. Accordingly, the display 102 may particularly display a color calibration pattern to facilitate color calibration of the display 102. That is, the color calibration pattern may allow the processor 108 to determine whether the color output by the display 102 matches the intended color output (i.e., the color input) as will be described further herein.

The color calibration pattern may be pattern or other graphic. The color calibration pattern may include any suitable number of combinations of patterns, colors, and the like. For example, the color calibration pattern may be a solid block of a single color, substantially encompassing the display area of display 102. In other examples, the color calibration pattern may include multiple colors in horizontal or vertical strips, checkerboard pattern, or the like.

The touchpad 104 is generally configured to receive touch input to the computing device 100. The touchpad 104 may therefore include a touch-sensitive layer (e.g., based on capacitance or other suitable technology) to allow the touch input. The touchpad 104 may further include a reflective layer 110 to reflect the color calibration pattern. For example, the reflective layer 110 may be located at the bottom (i.e., away from the touch-sensitive surface of the touch-sensitive layer) of the touchpad 104. The touch-sensitive layer of the touchpad 104 may include glass or another suitable transparent material to allow light to pass through the touchpad 104 to the reflective layer 110. The reflective layer 110 may include, for example, a silver, mercury, aluminum, or other metal-based coating. In some examples, the reflective layer 110 may be an integrated layer or coating of the touchpad 104 which is, for example, a chemical coating on the touch-sensitive layer of the touchpad 104. In other examples, the reflective layer 110 may be a separate layer adhered to the touch-sensitive layer of the touchpad 104.

The color sensor 106 is an optical sensor which may detect various visible spectrum wavelengths of light to determine the color. In particular, the color sensor 106 may generally be employed to enable adaptive brightness of the display 102. That is, the color sensor 106 may detect a brightness of an environment of the computing device 100 and allow the processor 108 to adjust the brightness of the display 102 correspondingly. The color sensor 106 may additionally detect the reflected color calibration pattern from the touchpad 104. The color sensor 106 may therefore be positioned on the computing device relative to the touchpad 104 to optimize reception of the reflected color calibration pattern.

The processor 108 is interconnected with the display 102 and the color sensor 106. The processor 108 may be a microcontroller, a microprocessor, a processing core, or similar device capable of executing instructions. The processor 108 may also include or be interconnected with a non-transitory machine-readable storage medium that may be electronic, magnetic, optical, or other physical storage device that stores executable instructions allowing the processor 108 to perform the functions described herein. In particular, the instructions may cause the processor 108 to calibrate a color output of the display 102 based on the color calibration pattern detected at the color sensor 106. The processor 108 may additionally apply adaptive brightness control based on the brightness detected by the color sensor 106 when the computing device 100 is in the open configuration.

Figure 2A:
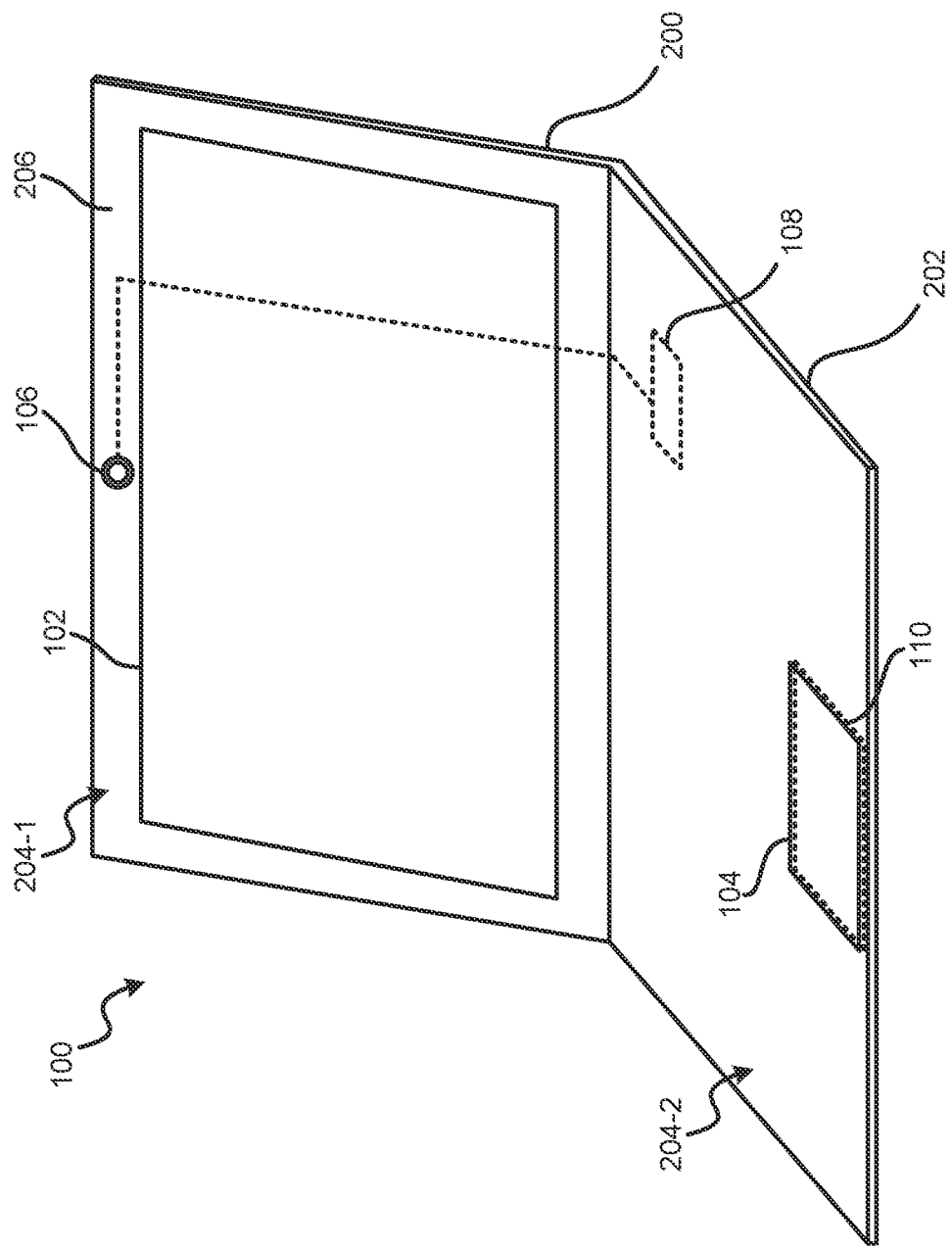
FIGS. 2A and 2B are schematic diagrams of the example computing device of FIG. 1 in an open configuration and a closed configuration, respectively.
Figure 2B:
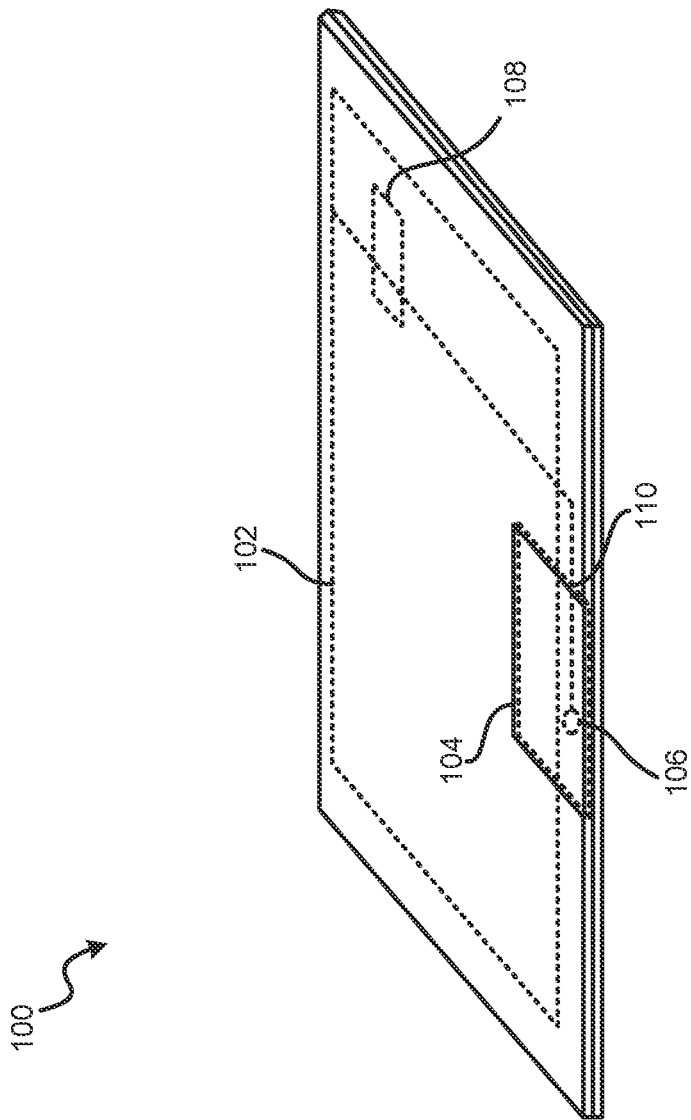

More particularly, referring to FIG. 2A, the computing device 100 may be a mobile computing device, such as a laptop, notebook computer, tablet with removable keyboard, or the like, and may be moveable between an open configuration, as depicted in FIG. 2A, and a closed configuration, as depicted in FIG. 2B. In particular, the computing device 100 may include a display housing 200 and a base 202 which are coupled to one another to move the computing device between the open configuration and the closed configuration (e.g., via a hinge connected to both the display housing 200 and the base 202).

In the open configuration, the base 202 and the display housing 200 are rotated apart, such that respective interior faces 204-1 and 204-2 of the display housing 200 and the base 202 are accessible (e.g., by a user). In the closed configuration, the base 202 and the display housing 200 are rotated together, such that the respective interior faces 204-1, 204-2 of the display housing 200 and the base 202 are adjacent one another.

The display 102 is supported in the display housing 200, and more particularly on the interior face 204-1 of the display housing 200. Additionally, the color sensor 106 may be supported in the display housing 200, substantially adjacent to the display 102 to allow for accurate detection of the luminosity and color temperature experienced by the display 102 for adaptive brightness and color tone control (i.e., to control the color tone based on color temperature of the environmental conditions of the display 102) when the computing device 100 is in the open configuration. For example, the interior face 204-1 of the display housing 200 may include a bezel 206 surrounding the display 102, and the color sensor 106 may be embedded in the bezel 206. The location of the color sensor 106 for adaptive brightness control may cause the color sensor 106 to be located relative to the display 102 in a position in which the color sensor 106 cannot readily and directly detect the light emitted by the display 102.

Thus, the color sensor 106 may detect light emitted by the display 102 based on its reflection from the touchpad 104 when the computing device 100 is in the closed configuration. In particular, the touchpad 104 is supported in the base 202, and more particularly on the interior face 204-2 of the base 202. Accordingly, when the computing device 100 is in the closed configuration, the touchpad 104 may be substantially directly across from the display 102 and the color sensor 106. Light emitted from the display 102 may therefore be emitted in the direction of the touchpad 104 to be reflected from the touchpad 104 and in particular the reflective layer 110, back towards the color sensor 106.

Figure 3:
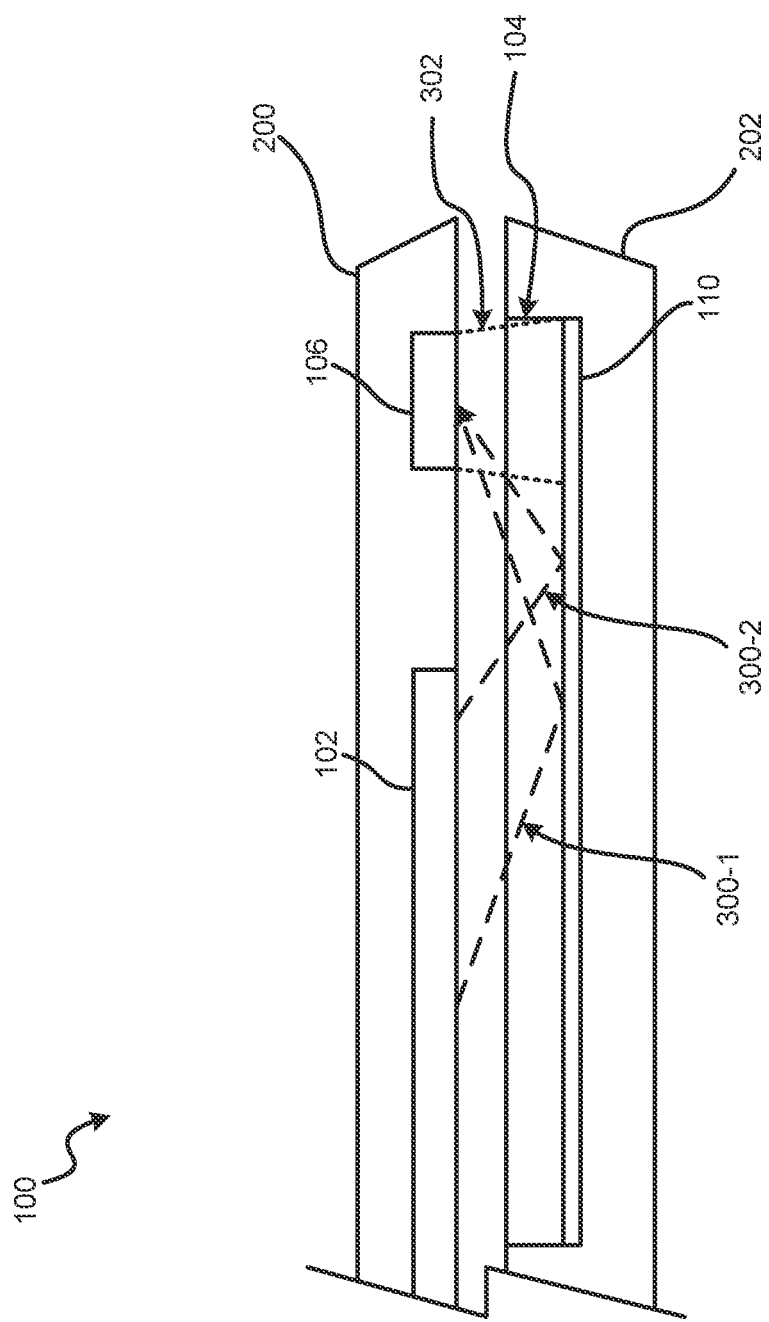
FIG. 3 is a schematic cross-sectional diagram of light paths emitted from the display of the example computing device of FIG. 1 in the closed configuration.

For example, referring to FIG. 3, a schematic cross-sectional diagram of light paths emitted from the display 102 while the computing device 100 is in the closed configuration is depicted.

The display 102 may emit light substantially omni-directionally, and in particular, at various angles away from the display 102. For example, the display 102 may emit light paths 300-1 and 300-2. Since the touchpad 104 is located opposite the display 102 when the computing device 100 is in the closed configuration, the light paths 300-1 and 300-2 are directed towards the touchpad 104.

The light paths 300-1 and 300-2 may traverse most of the touchpad 104, and in particular, the portions of the touchpad 104 formed of glass or another transparent material. The light paths 300-1 and 300-2 may then be reflected off of the reflected layer 110 and back towards the display housing 200. Based on the laws of reflection of light, the light paths 300-1 and 300-2 do not simply return to the display 102, but rather are reflected towards the color sensor 106. In this manner, the color sensor 106 may detect the color calibration pattern displayed by the display 102 via reflection of the color calibration pattern off the touchpad 104, and in particular, the reflective layer 110.

Since many of the light paths 300 originating in different locations on the display 102 may reflect off the touchpad 104 and terminate in substantially the same location at color sensor 106, it may be difficult to differentiate the origins of each light path. Accordingly, the color calibration pattern may be a solid block of a single color substantially encompassing the display area of the display 102.

Since the display 102 may emit light substantially omni-directionally, many light paths may not be reflected from the touchpad 104, and many light paths reflected from the touchpad 104 may not be directed to the color sensor 106. In order to optimize the number light paths (and therefore the amount of the reflected color calibration pattern) received at the color sensor 106, a field of view 302 of the color sensor 106 may be substantially or entirely encompassed by the touchpad 104 when the computing device 100 is in the closed configuration. That is, when the computing device 100 is in the closed configuration, the field of view 302 of the color sensor 106 is substantially or entirely occupied by the touchpad 104, rather than capturing a portion of the touchpad 104 and a portion of the base 202, or other components supported on the base 202. In particular, the color sensor 106 and the touchpad 104 may be specifically positioned in the display housing 200 and the base 202 respectively to enable such a configuration.

Figure 4:
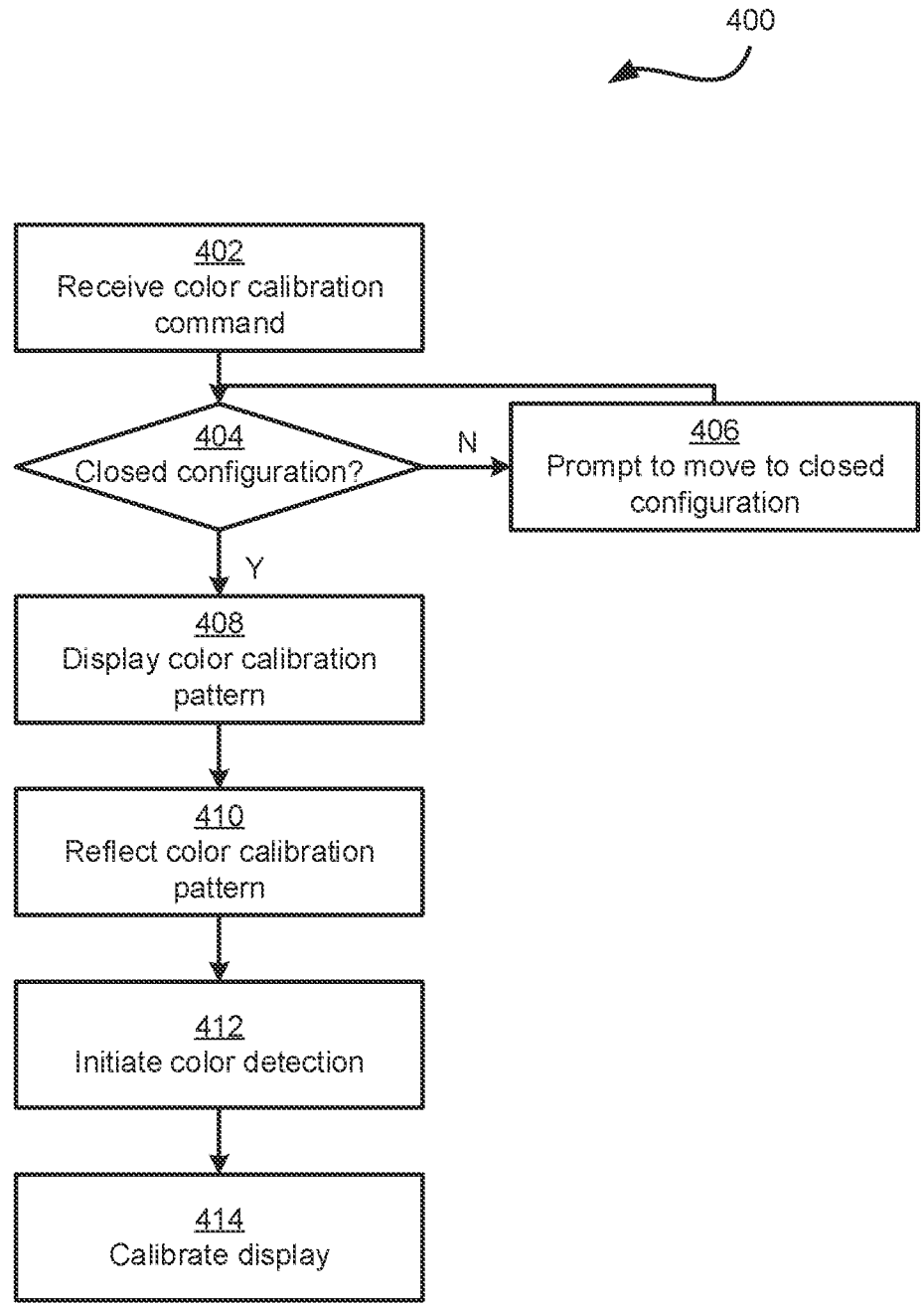
FIG. 4 is a flowchart of an example method of color calibration using reflected color calibration patterns.

In operation, the processor 108 may control the display 102 and the color sensor 106 to calibrate a color output of the display 102 based on the color calibration pattern detected at the color sensor 106. For example, referring to FIG. 4, an example method 400 of color calibrating a display of a computing device is depicted. The method 400 will be described below in conjunction with its performance by the computing device 100 and in particular by the processor 108. In other examples, the method 400 may be performed by other suitable devices.

At block 402, a color calibration command is received at the processor 108. A color calibration operation may be initiated, for example, based on user input requesting color calibration. In other examples, the color calibration may be performed as part of periodic system updates or maintenance. The color calibration command may be received at the processor 108 when the color calibration operation is initiated.

At block 404, since the color calibration is to be performed when the computing device 100 is in the closed configuration to allow the color sensor 106 to detect the reflected color calibration pattern, the processor 108 first determines whether the computing device 100 is in the closed configuration.

If the processor 108 determines that the computing device 100 is not in the closed configuration, the processor 108 proceeds to block 406. At block 406, since the computing device 100 is in the open configuration, the processor 108 may control the display 102 to provide a prompt for a user to move the computing device 100 to the closed configuration. The processor 108 then returns to block 404 to wait for the computing device 100 to be moved to the closed configuration. In some examples, the processor 108 may initiate a time out period, after which the color calibration operation is aborted.

If the processor 108 determines at block 404 that the computing device 100 is in the closed configuration, then the processor 108 proceeds to block 408. For example, the affirmative determination at block 404 may be in response to detecting that the computing device 100 has been moved to the closed configuration. In other examples, the computing device 100 may already be in the closed configuration based on the conditions of initiation of the color calibration operation.

At block 408, in response to detecting that the computing device 100 is in the closed configuration, the processor 108 controls the display 102 to display the color calibration pattern. In particular, the processor 108 may provide a color calibration input to the display 102 causing the display 102 to display the color calibration pattern.

At block 410, the touchpad 104, and in particular the reflective layer 110, reflects the color calibration pattern from the display 102.

At block 412, in response to detecting that the computing device 100 is in the closed configuration, substantially simultaneously with displaying the color calibration pattern at block 408, the processor 108 controls the color sensor 106 to initiate color detection. In particular, the color sensor 106 may detect the color calibration pattern reflected from the reflective layer 110 of the touchpad 104 at block 410.

At block 414, the processor 108 color calibrates the display 102 based on the color calibration pattern input to the display 102 and the reflected color calibration pattern detected by the color sensor 106.

In some examples, the processor 108 may first apply an adjustment factor to the reflected color calibration pattern detected by the color sensor 106. In particular, the light may be warped during travel through the touch-sensitive layer of the touchpad 104 (e.g., by refraction or similar) and upon being reflected by the reflective layer 110. Accordingly, the color emitted by the display 102 may differ from the color detected by the color sensor 106. Accordingly, the adjustment factor may compensate for losses or changes in the color detected at the color sensor 106 due to the reflection by the touchpad 104. The adjustment factor may be, for example, an embedded vendor-defined color factor (VDCF). Since the parameters (e.g., reflection rate, material, and adhesion of reflective layer 110, thickness of touchpad 104, etc.) of the touchpad 104 are expected to be consistent between instances of the computing device 100 of the same model, the adjustment factor may be a pre-defined factory-calibrated adjustment factor.

The application of the adjustment factor to the detected reflected color calibration pattern allows the processor 108 to determine the color calibration output of the display 102. The processor 108 may then compare the color calibration output of the display 102 to the color calibration input and calibrate the display 102 accordingly. In particular, the processor 108 may determine an input adjustment factor to be applied to subsequent inputs to achieve the desired outputs from the display 102.

As described above, an example computing device includes a color sensor to detect a brightness of an environment of the computing device when the computing device is in the open configuration and a processor to apply adaptive brightness control based on the brightness detected by the color sensor when the computing device is in the open configuration. The computing device can leverage the color sensor for adaptive brightness control to color calibrate the display. Since the color sensor may be embedded in a bezel of the display housing, the color sensor may not be able to readily detect the color emitted by the display. Accordingly, the computing device uses the reflection of a displayed color calibration pattern off of a reflective layer of a touchpad of the computing device when the computing device is closed as detected by the color sensor to perform the color calibration.

The scope of the claims should not be limited by the above examples but should be given the broadest interpretation consistent with the description as a whole.

The invention claimed is:

1. A computing device moveable between an open configuration and a closed configuration, the computing device comprising:
   a display;
   a touchpad to receive input for the computing device, the touchpad having a reflective layer;
   a color sensor to detect a brightness and a color temperature of an environment of the computing device when the computing device is in the open configuration; and
   a processor interconnected with the display and the color sensor, the processor to:
      in response to a color calibration command, determine whether the computing device is in the closed configuration;
      when the computing device is in the closed configuration: (i) provide a color calibration input to the display to display a color calibration pattern and (ii) control the color sensor to detect a reflection of the displayed color calibration pattern from the touchpad; and
      calibrate the display based on the reflection.

2. The computing device of claim 1, wherein the color sensor is positioned to detect the reflection of the displayed color calibration pattern from the touchpad when the computing device is in the closed configuration.

3. The computing device of claim 2, wherein a field of view of the color sensor is encompassed by the touchpad when the computing device is in the closed configuration.

4. The computing device of claim 1, wherein the processor is to:
   apply an adjustment factor to the color calibration pattern detected at the color sensor to obtain a color calibration output; and
   compare the color calibration output to the color calibration input to calibrate the display.

5. The computing device of claim 4, wherein to calibrate the display, the processor is to determine an input adjustment factor to be applied to subsequent inputs.

6. The computing device of claim 1, wherein the processor is to, when the computing device is in the open configuration, provide a prompt for a user to move the computing device to the closed configuration.

7. The computing device of claim 1, wherein the processor is to apply adaptive brightness and color tone control based on the brightness and the color temperature detected by the color sensor when the computing device is in the open configuration.

8. A computing device comprising:
a display to display a color calibration pattern;
a touchpad to receive input for the computing device, the touchpad having a reflective layer to reflect the color calibration pattern;
a color sensor to detect the reflected color calibration pattern from the touchpad; and
a processor interconnected with the color sensor and the display, the processor to calibrate a color output of the display based on the color calibration pattern detected at the color sensor.

9. The computing device of claim 8, wherein the touchpad further comprises a touch-sensitive layer to receive the input, the touch-sensitive layer comprising a transparent material.

10. The computing device of claim 9, wherein the reflective layer comprises a chemical coating on the touch-sensitive layer of the touchpad.

11. The computing device of claim 8, wherein the processor is to:
apply an adjustment factor to the color calibration pattern detected at the color sensor; and
use the adjusted color calibration pattern to calibrate the color output of the display.

12. A computing device comprising:
a display housing and a base coupled to move the computing device between an open configuration and a closed configuration;
a display supported in the display housing, the display to display a color calibration pattern;
a touchpad supported in the base, the touchpad to reflect the color calibration pattern from the display when the computing device is in the closed configuration;
a color sensor positioned on the display housing to detect the color calibration pattern reflected from the touchpad when the computing device is in the closed configuration; and
a processor interconnected with the color sensor and the display, the processor to calibrate a color output of the display based on the color calibration pattern detected at the color sensor.

13. The computing device of claim 12, wherein the touchpad comprises a reflective coating to reflect the color calibration pattern.

14. The computing device of claim 12, wherein a field of view of the color sensor is encompassed by the touchpad when the computing device is in the closed configuration.

15. The computing device of claim 12, wherein the processor is to:
apply an adjustment factor to the color calibration pattern detected at the color sensor; and
use the adjusted color calibration pattern to calibrate the color output of the display.

* * * * *